| United States Patent [19] | [11] Patent Number: 4,925,529 |
|---|---|
| Dotzauer et al. | [45] Date of Patent: May 15, 1990 |

[54] LIGHT-WEIGHT BUILDING BOARDS BASED ON MINERAL FIBERS AND THERMOPLASTIC BINDERS

[75] Inventors: Bernhard Dotzauer, Maxdorf; Hans Kast, Mannheim; Wilhelm F. Beckerle, Bobenheim-Roxheim; Rainer Hummerich, Worms, all of Fed. Rep. of Germany

[73] Assignee: BASF Aktiengesellschaft, Ludwigshafen, Fed. Rep. of Germany

[21] Appl. No.: 788,574

[22] Filed: Oct. 17, 1985

[30] Foreign Application Priority Data

Oct. 19, 1984 [DE] Fed. Rep. of Germany ....... 3438388

[51] Int. Cl.$^5$ .............................................. D21H 13/38
[52] U.S. Cl. ..................................... 162/152; 162/158; 162/168.1; 162/169; 162/181.2
[58] Field of Search ............... 162/145, 146, 156, 152, 162/168.1, 169, 181.2, 158

[56] References Cited

U.S. PATENT DOCUMENTS

| 4,032,392 | 6/1977 | Koller | 162/169 |
|---|---|---|---|
| 4,178,205 | 12/1979 | Wessling et al. | 162/168.1 |
| 4,187,142 | 2/1980 | Pickelman et al. | 162/169 |
| 4,426,470 | 1/1984 | Wessling et al. | 162/169 |
| 4,481,075 | 11/1984 | Dailly et al. | 162/168.1 |

*Primary Examiner*—Peter Chin
*Attorney, Agent, or Firm*—Oblon, Spivak, McClelland, Maier & Neustadt

[57] ABSTRACT

Light-weight building boards which are based on mineral fibers and thermoplastic binders, may furthermore contain fillers, fireproofing agents and water repellents, contain, as the binder, from 4 to 20%, based on the weight of the mineral fibers, of polymers having a glass transition temperature of from 60° to 110° C., and consisting of not less than 60% by weight, based on the copolymer, of (meth)acrylates of alcohols of 1 to 4 carbon atoms and not more than 40% by weight of (meth)acrylonitrile and/or styrene, and additionally contain salts of polyvalent metals with carboxylic acids of 12 to 36 carbon atoms are distinguished by low water absorption and excellent sound-insulating characteristics, are flame-retardant and exhibit dimensional stability even in the tropics.

4 Claims, No Drawings

LIGHT-WEIGHT BUILDING BOARDS BASED ON MINERAL FIBERS AND THERMOPLASTIC BINDERS

Light-weight building boards based on mineral fibers, binders and, in general, also fillers, fireproofing agents and water repellents and used, for example, for sound insulation are produced on a large scale industrially. The binder predominantly used is starch, which is employed in amounts as high as about 15%, based on the mineral fibers. The fillers used are generally finely divided clays, eg. kaolin, and the mineral fibers employed are rock wool and/or glass fibers, which generally have lengths of from 5 to 50 mm and thicknesses of about 1.7–3.3 dtex. The amount of fillers can be varied within wide limits and is frequently from 10 to 30% by weight, based on the mineral fibers. Sound-insulating boards of this type are generally about 1–3 cm thick. A disadvantage of these conventional light-weight building boards is their sensitivity to moisture, which generally makes it necessary to coat or impregnate the back of the boards with, for example, duroplasts, such as aqueous melamine/formaldehyde resins, so that further drying is therefore required. For this reason alone, the production of boards of this type is relatively energy-consumptive. Moreover, the starch migrates and therefore causes discoloration of decorative coatings, which are usually applied to the front of the board.

According to East German Pat. No. 83,315, sound-absorbing light-weight building boards have been produced in which mineral fibers are bound with cement or gypsum and with a polyvinyl acetate dispersion with the addition of an asphalt emulsion. The addition of asphalt emulsion is necessary in order to prevent efflorescence, although it leads to discoloration and the resulting products possess a comparatively high density, low strengths and poor heat distortion resistance.

In the process described in U.S. Pat. No. 3,779,862, flexible mineral fiber boards are produced by adding an aqueous dispersion of an anionic, self-crosslinking polyacrylate, an aluminum hydroxide suspension and a synthetic anionic polyelectrolyte during the preparation of the aqueous suspension of the mineral fibers, and then forming the boards by removing water. In this rather involved process, however, the boards obtained are neither self-supporting nor moisture-resistant.

Finally, German Laid-Open Application DOS 2,545,728 discloses the preparation of insulating boards in which perlite and rock wool are bound with a polymer dispersion based on a copolymer of butyl acrylate, acrylonitrile and acrylic acid, with the addition of a defibrating agent based on an aqueous solution of a carboxyl-containing polyacrylate. However, this procedure gives insulating boards which provide very good heat insulation but possess unsatisfactory compressive strength and flexural tensile strength. On the basis of the flexural strength of the insulating board stated in Example 1 of German Laid-Open Application DOS 2,545,728, it is evident that the binder used was a copolymer whose glass transition temperature is below −20° C.

We have found that light-weight building boards which are based on mineral fibers and thermoplastic binders amy furthermore contain fillers, fireproofing agents and water repellents and contain, as the binder, from 4 to 20%, based on the weight of the mineral fibers, of polymers which have a glass transition temperature of from 60° to 110° C. and consist of from 60 to 100% by weight, based on the copolymer, of (meth)acrylates of alcohols of 1 to 4 carbon atoms and from 0 to 40% by weight of (meth)acrylonitrile and/or styrene have particularly advantageous properties if they additionally contain salts of carboxylic acids of 12 to 36 carbon atoms with polyvalent metals. Light-weight building boards of this type have sound-insulation properties and can be produced in a conventional manner, in particular by treating mineral fibers with an anionic dispersion of a polymer, having a glass transition temperature of from 60° to 110° C. and consisting of (meth)acrylates of alcohols of 1 to 4 carbon atoms and from 0 to 40% by weight of (meth)-acrylonitrile and/or styrene, and a precipitating agent in aqueous suspension, separating off the aqueous phase with sheet formation, and drying the sheets.

The light-weight building boards contain the conventional mineral fibers, eg. rock wool, basalt wool and/or glass fibers which in general are from 0.2 to 8, in particular from 0.5 to 5, cm long and have a thickness of about 1.7–3.3 dtex. In the production of boards, mineral fibers of this type are often used in the sized state, mineral oils and synthetic polymers, in particular polyacrylate dispersions and polyacrylic acids, usually being employed as sizing agents for such mineral fibers.

The thermoplastic binders, ie. the polymers which have a glass transition temperature of from 60° to 110° C., preferably from 60° to 95° C., and consist of from 60 to 100, in particular from 60 to 80, % by weight, based on the polymer, of methacrylates and/or acrylates of alcohols of 1 to 4 carbon atoms and from 0 to 40, in particular from 20 to 40, preferably from 30 to 40, % by weight of acrylonitrile and/or methacrylonitrile and/or styrene, in particular acrylonitrile, are present in the light-weight building boards in an amount of from 4 to 20, preferably from 6 to 15, in particular from 8 to b 12, % by weight, based on the weight of the mineral fibers. They are derived from, for example, methyl methacrylate, ethyl acrylate, ethyl methacrylate, n-butyl methacrylate, tert.-butyl acrylate and tert.-butyl methacrylate, and, if appropriate, not more than 25% by weight of n-butyl acrylate and methyl acrylate. The polymeric binders may furthermore contain, as copolymerized units, acrylic acid and/or methacrylic acid and/or acrylamide and/or methacrylamide in amounts of not more than 5% by weight, based on the polymer. In some cases, it is advantageous if the binder polymers contain, as copolymerized units, small amounts, preferably from 2 to 5%, based on the weight of the binder polymer, of crosslinking monomers. Examples of these are, in particular, N-methylolacrylamide and N-methylolmethacrylamide and their $C_1$–$C_4$-ethers, such as N-methoxy-, N-n-butoxy- and N-ethoxy-N-methylacrylamide and -methacrylamide. In general, they are used in the production of the light-weight building boards in the form of their aqueous anionic dispersions, which are prepared by emulsion polymerization in a conventional manner using the usual amounts of water-soluble salts of carboxylic acids of 12 to 36, in particular 15 to 22, carbon atoms, in particular their potassium, sodium or ammonium salts, as emulsifiers, and the conventional amounts of the usual free radical polymerization initiators. Noteworthy emulsifiers for this procedure are the sodium and potassium salts of saturated or unsaturated fatty acids, eg. of palmitic, stearic and oleic acid. Salts of dimeric fatty acids, for example those of 24 to 36 carbon atoms, are also suitable.

Polymer dispersions of this type are commercially available and are generally in the form of from 40 to 70% strength aqueous dispersions.

When the sound-insulating and heat-insulating light-weight building boards are produced by suspending the mineral fibers and adding binders to the aqueous mineral fiber suspension, the poly (meth)acrylate dispersions of the stated type can be added as such to this suspension. The binder polymer is then deposited onto the fibers by means of a precipitating agent and binds these fibers after the conventional sheet-forming procedure, which is effected, for example, on screens with removal of the aqueous phase. Sheet formation is followed by drying at elevated temperatures, generally at from 110° to 220° C., preferably from 140° to 180° C. For example, infrared lamps, hot air or microwaves can be used to effect drying.

In the production of the light-weight building boards from an aqueous suspension of the mineral fibers, cationic polymer dispersions may advantageously be used as precipitating agents. Such polymer dispersions contain conventional cationic emulsifiers and, if required, also conventional nonionic emulsifiers, for example oxyalkylated alkylphenols, oxyalkylated fatty alcohols or oxyalkylated acids in conventional amounts of about 0.1–2.0% by weight, based on the polymer. Cationic polymer dispersions of this type are also available commercially. Finally, salts of polyvalent metals, in particular aluminum salts, especially aluminum sulfate, may also advantageously be employed as precipitating agents, the amount of these salts generally being from 0.5 to 15, preferably from 2 to 8, % by weight, based on the poly(meth)acrylate present in the anionic poly(meth)acrylate dispersion.

The usual practice of employing commercial flocculants, such as polyacrylamide, for flocculating finely divided inorganic additives is often advantageous since it results in clear filtrates.

The ready-prepared dry boards are generally from 0.5 to 10, frequently from 1 to 5, mostly from 1 to 3, preferably from 1 to 2, cm thick. They generally contain fillers, such as finely divided clays, eg. kaolin and montmorillonite, feldspar, chalk, kieselguhr and/or mica, which may be present in an amount of not more than 30, preferably from 10 to 20, % by weight, based on the mineral fibers.

The light-weight building boards, which generally exhibit very advantageous fire behavior, may furthermore contain as much as 10, preferably from 1 to 3, % by weight, based on the mineral fibers, of conventional fireproofing agents, eg. aluminum silicates and aluminum hydroxides, borates, such as borax, and/or phosphates, such as primary sodium phosphate. Finally, in the production of the light-weight building boards, it may be advantageous in some cases also to add as much as 5% by weight, based on the mineral fiber, of additional water repellents, such as silicones (polysiloxanes) and waxes, although from 1 to 2% by weight of the said water repellents are often sufficient.

The visible face of the novel light-weight building boards can, for example, be provided with the conventional sound-absorbing structures and may be coated in a conventional manner. Materials suitable for this purpose are available commercially. Coatings of this type which are based on commercial, aqueous polymer dispersions may also be colored in the usual manner.

The novel light-weight building boards exhibit low water absorption and possess excellent sound-insulating characteristics when the surface is appropriately treated; they are rigid and do not become warped even in a warm moist atmosphere (tropics) or in the wet state. They are flame-retardant and release absorbed water particularly readily without losing their functional properties. Surprisingly, the novel light-weight building boards can be produced in a particularly energy-saving manner by the novel production process since the water can be removed substantially more easily from the compressed boards by evaporation during drying than when starch is used as the binder. A further advantage of the novel production process is that the waste water is virtually free of harmful substances. The boards can easily be processed mechanically and are resistant to rotting.

In the Examples which follow, parts and percentages are by weight, unless stated otherwise. Parts by volume bear the same relation to parts (by weight) as that of the liter to the kilogram. The mineral wool used in the examples consists of fibers having an average length of 3 cm and a diameter of less than b 3.3 dtex.

EXAMPLES 1 TO 4

The amounts of the anionic dispersions of the binder polymers and 10% strength aqueous alum solution shown in the Table below are added in each case to a suspension of 230 parts of rock wool and 85 parts of clay in 8000 parts of water, and flocculation is then effected with the addition of about 1 part of 0.1% strength aqueous polyacrylamide solution (flocculant). When the suspension has been thoroughly dispersed, the material is discharged under reduced pressure onto a screen, and dewatering is promoted by gentle pressing (less than 0.1 bar). The material is applied so that the resulting sheet is 15 mm thick after pressing. Drying is then carried out for about 18 minutes in a microwave oven to give light-weight building boards, whose density, water absorption, dimensional sta-bility and breaking strength are summarized in the Table below. In this Table, i-BA=isobutyl acrylate, nBA=n-butyl acrylate, t.BA=-tert.-butyl acrylate, AN=acrylo-nitrile, MAN=methacrylonitrile, MAA=methacrylic acid, MMA=methyl methacrylate, MA=methyl acrylate, and MA-MOL=N-methylolmethacrylamide.

The water absorption, dimensional stability and breaking strength in a warm moist atmosphere were determined as follows:

(a) Water absorption

Strips measuring 25×4×1.5 cm are stored under standard conditions of temperature and humidity 23° C./65% relative humidity) for not less than 24 hours after the production of the light-weight building boards. They are then immersed completely in water; after the time stated in the Table, water drops are removed from the surface with filter paper and the strips are weighed. The values given in the Table are mean values of 3 measurements in each case.

(b) Dimensional stability

Strips measuring 25×4×1.5 cm are placed in a conditioned chamber (39° C., 90% relative humidity) no earlier than 24 hours after the production of the light-weight building board. The strips are positioned horizontally and flat and are supported near the end edges, and are subjected to a load in the middle by means of a 1 kg weight so that the load acts over the entire length of the test specimen. The sag in the test specimen is measured after the load has been removed, and an indication of the long-term behavior of the light-weight building boards is obtained in this manner. The values given in the Table are mean values for 3 measurements.

(c) Breaking strength

This is determined in the bending test according to DIN 53,423, the breaking force for the 25 cm long, 4 cm wide and 1.5 cm thick test specimen being measured. The data in the Table are mean values of 5 individual measurements in each case.

| Example | X Disp. (parts) | % content (dispersion) | Binder Polymer | % of emulsifier (based on polymer) | Precipitating agent: 10% strength alum solution (parts by volume) | Tg (°C.) | Density g/cm³ | H₂O absorption in % after 1 h | H₂O absorption in % after 2 h | Dimensional stabiltiy (mm) after — hours | Breaking strength (N) |
|---|---|---|---|---|---|---|---|---|---|---|---|
| 1 | 62 | 40 | 25 MAN<br>20 MA/50 MMA<br>4 MAMOL,<br>1 MAA | 1.5 Na palmitate mitate | 53 | 78 | 0.37 | 3.5 | 4.7 | 1/48 1.5/96 | 48 |
| 2 | 31 | 60 | 40 AN/<br>40 MMA<br>20 MA | 2.1 NH₄ stearate | 48 | 80 | 0.41 | 4.8 | 6.0 | 0/48 0.5/120 | 55 |
| 3 | 84 | 38.5 | 30 AN<br>40 MMA<br>10 t-BA<br>20 MA | 2.9 Na oleate | 95 | 74 | 0.45 | 3.4 | 5.1 | 0/48 0/96 | 63 |
| 4 | 43 | 48 | 35 AN<br>60 MMA<br>15 t-BA | 1.4 Na oleate | 36 | 91 | 0.35 | 3.0 | 4.2 | 0/48 0/120 | 62 |

We claim:

1. A light weight building board comprising mineral fibers and a thermoplastic binder, said thermoplastic binder, in an amount of from 4 to 20%, based on the weight of the mineral fibers, being a polymer having a glass transition temperature of from 60° to 110° C. and consisting of from 60 l to 100% by weight, based on the polymer, of (meth)acrylates of alcohols of 1 to 4 carbon atoms, from 0–40% by weight, based on the weight of the polymer, of (meth)acrylonitrile, styrene, or mixtures thereof, from 0–5% based on the weight of the polymer, of (meth)acrylic acid, (meth)acrylamide, or mixture thereof, and from 0–5%, based on the weight of the polymer, of a crosslinking monomer, and a salt of a carboxylic acid of 12 to 36 carbon atoms with a polyvalent metal.

2. A process for the production of a light-weight building board which comprises treating mineral fibers with a dispersion of a polymer, having a glass transition temperature of from 60° to 110° C. and consisting of from 60–100% by weight, based on the polymer, of (meth)acrylates of alcohols of 1 to 4 carbon atoms 0 to 40%, by weight, based on the weight of the polymer, of (meth)acrylonitrile, styrene, or mixtures thereof, from 0–5% based on the weight of the polymer, of (meth)acrylic acid, (meth) acrylamide, or mixtures thereof, and from 0–5%, based on the weight of the polymer, of a crosslinking monomer, and a precipitating agent in aqueous suspension, separating off the aqueous phase with sheet formation and drying the sheets, wherein said dispersion of a polymer contains a water-soluble salt of a carboxylic acid of 12 to 36 carbon atoms as an emulsifier.

3. A process as claimed in claim 2, wherein the precipitating agent is a cationic polymer dispersion.

4. A process as claimed in claim 2, wherein the precipitating agent is an aluminum salt.

* * * * *